(12) United States Patent
Solheim et al.

(10) Patent No.: US 12,291,842 B2
(45) Date of Patent: May 6, 2025

(54) TOP LOADING CABLE PLOUGH

(71) Applicant: NEXANS, Courbevoie (FR)

(72) Inventors: Harald Solheim, Oslo (NO); Tom Thorjussen, Fjellhamar (NO)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 17/676,751

(22) Filed: Feb. 21, 2022

(65) Prior Publication Data

US 2022/0333340 A1 Oct. 20, 2022

(30) Foreign Application Priority Data

Feb. 22, 2021 (EP) .................................... 21305213

(51) Int. Cl.
   *E02F 5/14* (2006.01)
   *E02F 5/10* (2006.01)
   *H02G 1/10* (2006.01)

(52) U.S. Cl.
   CPC .............. *E02F 5/106* (2013.01); *E02F 5/145* (2013.01); *H02G 1/10* (2013.01)

(58) Field of Classification Search
   CPC . E02F 5/106; E02F 5/145; E02F 9/205; E02F 5/14; E02F 5/104; E02F 5/027; E02F 5/10; E02F 5/02; H02G 1/10; H02G 1/06
   See application file for complete search history.

(56) References Cited

U.S. PATENT DOCUMENTS

| | | | | |
|---|---|---|---|---|
| 2,048,710 | A * | 7/1936 | Ranney | E21B 7/003 37/351 |
| 2,136,911 | A * | 11/1938 | Briscoe | E02F 5/027 37/372 |
| RE20,990 | E * | 1/1939 | Wright | E02F 5/027 37/366 |
| 2,849,809 | A * | 9/1958 | Chattin | E02F 3/7663 37/372 |

(Continued)

FOREIGN PATENT DOCUMENTS

| | | | | |
|---|---|---|---|---|
| GB | 2 049 094 | | 12/1980 | |
| GB | 2545925 | A * | 7/2017 | ............. E02F 5/104 |

(Continued)

OTHER PUBLICATIONS

International Search Report dated Sep. 3, 2021.

*Primary Examiner* — Edwin J Toledo-Duran
(74) *Attorney, Agent, or Firm* — CANTOR COLBURN LLP

(57) ABSTRACT

A plough for burying a cable has a base frame, an upper frame member and a ploughshare support; a topside of the ploughshare support features a cable trough; and a cable guiding path extends from a front end to a rear end of the plough. The cable guiding path is arranged between the base frame and the upper frame member and along the cable trough. The upper frame member is movably connected relative to the base frame, such that the upper frame member may move between a first position. The upper frame member is arranged above the cable guiding path, and a second (Continued)

position wherein the upper frame member is displaced away from the cable guiding path. The whole extent of the cable guiding path is accessible from above when the upper frame member is in the second position, such that a cable may be lowered onto the cable guiding path.

11 Claims, 8 Drawing Sheets

(56) References Cited

U.S. PATENT DOCUMENTS

| | | | | |
|---|---|---|---|---|
| 3,238,734 | A * | 3/1966 | Rhodes | E02F 5/107 37/332 |
| 3,333,432 | A * | 8/1967 | Hale | E02F 5/107 405/164 |
| 3,434,297 | A * | 3/1969 | Spollen | E02F 5/105 405/160 |
| 3,462,963 | A * | 8/1969 | Moore | E02F 5/104 405/164 |
| 3,504,504 | A * | 4/1970 | Elliott | E02F 5/106 405/163 |
| 3,526,047 | A * | 9/1970 | Goltz | E02F 9/085 280/43.23 |
| 3,590,589 | A * | 7/1971 | Smulders | E02F 5/105 405/161 |
| 3,627,372 | A * | 12/1971 | Carpenter | E02F 3/3681 294/198 |
| 3,670,514 | A * | 6/1972 | Breston | E02F 5/109 405/160 |
| 3,722,224 | A * | 3/1973 | Roy | E02F 5/104 405/163 |
| 3,751,927 | A * | 8/1973 | Perot, Jr. | E02F 5/107 405/162 |
| 3,877,237 | A * | 4/1975 | Norman | E02F 5/105 405/160 |
| 3,897,639 | A * | 8/1975 | Hansen | E02F 9/06 37/313 |
| 3,990,377 | A * | 11/1976 | Marquinez | H04B 5/266 405/161 |
| 4,022,028 | A * | 5/1977 | Martin | E02F 3/9206 37/330 |
| 4,037,422 | A * | 7/1977 | DEBoer | E02F 5/107 405/160 |
| 4,039,087 | A * | 8/1977 | Sandvick, Sr. | F16L 1/09 29/237 |
| 4,091,629 | A * | 5/1978 | Gunn | E02F 5/106 405/181 |
| 4,124,991 | A * | 11/1978 | Adler | F16L 1/18 405/166 |
| 4,129,992 | A * | 12/1978 | Carlsson | H02G 1/10 405/164 |
| 4,149,326 | A * | 4/1979 | Rosa | E02F 5/108 405/160 |
| 4,218,158 | A * | 8/1980 | Tesson | F16L 1/26 405/158 |
| 4,268,189 | A * | 5/1981 | Good | F16L 1/06 405/172 |
| 4,268,190 | A * | 5/1981 | Tesson | F16L 1/26 405/184.5 |
| 4,274,760 | A * | 6/1981 | Norman | E02F 5/105 405/160 |
| 4,295,757 | A * | 10/1981 | Gaspar | E02F 5/107 405/164 |
| 4,301,606 | A * | 11/1981 | Hofmeester | E02F 5/108 37/329 |
| 4,362,436 | A * | 12/1982 | Harmstorf | E02F 5/109 405/164 |
| 4,410,297 | A * | 10/1983 | Lynch | E02F 5/104 405/181 |
| 4,465,400 | A * | 8/1984 | Adams | F16L 1/161 405/169 |
| 4,470,720 | A * | 9/1984 | Lennard | E02F 5/108 405/164 |
| 4,585,372 | A * | 4/1986 | Grinstead | E02F 5/106 405/174 |
| 4,586,850 | A * | 5/1986 | Norman | E02F 5/105 405/160 |
| 4,664,553 | A | 5/1987 | Grinsted et al. | |
| 4,714,378 | A * | 12/1987 | Lincoln | E02F 5/104 405/161 |
| 4,714,379 | A * | 12/1987 | Gilchrist, Jr. | E02F 5/06 405/166 |
| 4,721,409 | A * | 1/1988 | Harmstorf | E02F 3/10 405/163 |
| 4,749,308 | A * | 6/1988 | Izawa | E02F 3/8858 405/161 |
| 4,802,793 | A * | 2/1989 | Grinsted | H02G 1/10 405/164 |
| 4,812,079 | A * | 3/1989 | Johnson | E02F 5/104 405/164 |
| 4,877,355 | A * | 10/1989 | Van Pelt | E02F 5/107 405/158 |
| 4,896,998 | A * | 1/1990 | Reece | F16L 1/12 405/160 |
| 4,992,000 | A * | 2/1991 | Doleshal | E02F 5/108 405/164 |
| 5,349,765 | A * | 9/1994 | Kitanaka | E02F 3/142 37/356 |
| 5,626,438 | A * | 5/1997 | Etheridge | E02F 5/104 15/104.04 |
| 5,659,983 | A * | 8/1997 | Coutarel | E02F 5/12 405/163 |
| 5,722,793 | A * | 3/1998 | Peterson | B63B 35/06 405/164 |
| 5,795,101 | A * | 8/1998 | Bill | F16L 1/06 405/184.5 |
| 6,189,244 | B1 * | 2/2001 | Johnson | E02F 5/14 405/181 |
| 6,273,642 | B1 * | 8/2001 | Anderson | E02F 5/105 405/163 |
| 6,705,029 | B2 * | 3/2004 | Anderson | E02F 5/14 405/160 |
| 6,719,494 | B1 * | 4/2004 | Machin | E02F 5/107 405/160 |
| 6,837,653 | B1 * | 1/2005 | Grinsted | E02F 5/145 405/164 |
| 9,605,407 | B2 * | 3/2017 | Penner | E02F 5/027 |
| 10,711,432 | B2 * | 7/2020 | White | E02F 5/106 |
| 11,466,425 | B2 * | 10/2022 | Alumbaugh | A01B 31/00 |
| 11,613,870 | B2 * | 3/2023 | Walker | E02F 5/109 405/159 |
| 2002/0017041 | A1 * | 2/2002 | Gloppen | E02F 5/006 37/344 |
| 2003/0201011 | A1 * | 10/2003 | Beals | F16K 7/06 137/15.08 |
| 2007/0253780 | A1 * | 11/2007 | Pihl | E02F 5/109 405/184 |
| 2010/0095560 | A1 * | 4/2010 | Grinsted | E02F 5/104 37/352 |
| 2011/0211913 | A1 * | 9/2011 | Lazzarin | E02F 5/109 405/163 |
| 2012/0114420 | A1 * | 5/2012 | Lazzarin | F16L 1/163 405/171 |
| 2013/0115006 | A1 * | 5/2013 | Oldervoll | E02F 5/109 405/160 |
| 2014/0150303 | A1 * | 6/2014 | Wilson | E02F 5/125 37/342 |
| 2014/0154014 | A1 * | 6/2014 | Wilson | E02F 5/106 172/430 |
| 2014/0283421 | A1 * | 9/2014 | Manchester | E02F 5/109 37/309 |
| 2014/0345171 | A1 * | 11/2014 | Manchester | E02F 3/088 37/352 |
| 2015/0110563 | A1 * | 4/2015 | Manchester | B66C 3/20 405/184.4 |
| 2016/0215476 | A1 * | 7/2016 | Walker | E21B 41/04 |
| 2018/0216314 | A1 * | 8/2018 | Bonel | E02F 5/145 |

(56) References Cited

U.S. PATENT DOCUMENTS

| | | | | |
|---|---|---|---|---|
| 2020/0165796 A1* | 5/2020 | Manchester | .......... | E02F 3/9218 |
| 2020/0318314 A1* | 10/2020 | Lu | .......... | E02F 5/107 |
| 2021/0010230 A1* | 1/2021 | Haddorp | .......... | E02F 3/8858 |
| 2021/0292995 A1* | 9/2021 | Walker | .......... | E02F 5/104 |
| 2022/0352699 A1* | 11/2022 | Walker | .......... | H02G 1/10 |
| 2022/0412046 A1* | 12/2022 | White | .......... | H02G 1/10 |

FOREIGN PATENT DOCUMENTS

| | | | | |
|---|---|---|---|---|
| JP | S6343508 A | 2/1988 | | |
| NL | 2024240 B1 * | 7/2021 | .......... | E02F 5/106 |
| WO | WO-2021094193 A1 * | 5/2021 | .......... | E02F 5/106 |

* cited by examiner

Fig. 5 (Detail A)

TOP LOADING CABLE PLOUGH

RELATED APPLICATION

This application claims the benefit of European Patent Application No. 21 305 213.7, filed on Feb. 22, 2021, the entirety of which is incorporated by reference.

FIELD OF THE INVENTION

The present invention relates to the field of ploughs, in particular ploughs used to bury cables or pipes in the seabed.

BACKGROUND AND PRIOR ART

Ploughs for burying cables or pipes in the seabed are well known.

Prior art ploughs are disclosed in for instance EP 0117038 A1, EP 0278705 B1, GB 2357134 A and U.S. Pat. No. 3,333,432.

The cable ploughs are designed to plough a trench and place the cable/pipe in the trench in a single operation.

Before starting a ploughing operation, the cable must be arranged within the plough.

Perhaps the most common method for arranging a cable within a plough is to load the cable while the plough is topside and then lowering both the plough and the cable to the seabed by a crane/winch arranged on a topside vessel. The method entails a high risk of damaging the cable due to the small bend radii inflicted on the cable, compression/kink during landing, as well as tearing caused by sliding of the cable relative to the plough.

A further method of arranging a cable in a plough is by first laying the cable on the seabed. The plough is then landed over the cable and the cable lifted from the seabed into the plough from underneath by a complex cable handling system built into the plough. During lifting of the cable into the plough there is a high risk of cable damage since the cable is subjected to small sag bend radii needed to allow the topside vessel to position the plough where the cable is arranged on the seabed. The method also entails a risk of cable damage when landing the plough over the cable arranged on the seabed.

Due to the small bend radii being inflicted upon the cable during use of both prior art methods, the type and design of cables suitable for use with the prior art ploughs are restricted since the cables must tolerate quite small bend radii.

The object of the present invention is to provide a plough, into which a cable may be loaded in an easy manner with a significantly reduced risk of cable damage. A further object of the invention is to provide a plough allowing for the use of cables having larger minimum bend radii than what is possible when using a prior art plough.

SUMMARY OF THE INVENTION

The present invention is defined by the attached claims and in the following:

In a first aspect, the present invention provides a top loading plough for burying a cable, the plough comprises a base frame (or chassis), an upper frame member and a ploughshare support;
  a topside of the ploughshare support features a cable trough; and
  a cable guiding path extends from a front end to a rear end of the plough, the cable guiding path is arranged between the base frame and the upper frame member and along the cable trough; and
  the upper frame member is movably connected relative to the base frame, such that the upper frame member may move between a first position, wherein the upper frame member is arranged above the cable guiding path, and a second position wherein the upper frame member is displaced away from the cable guiding path;
  wherein the whole extent (i.e. the whole length) of the cable guiding path is accessible from above when the upper frame member is in the second position, such that a cable may be lowered onto the cable guiding path.

In other words, the cable guiding path may pass between the base frame and the upper frame member. The cable guiding path may pass below the upper frame member.

In other words, the plough according to the invention is configured for top loading of a cable, i.e. loading a cable onto the plough from above.

The cable guiding path may be arranged between the upper frame member and the base frame when the upper frame member is in the first position. When the upper frame member is in the first position a cable channel being part of the cable guiding path is formed between the upper frame member and the base frame. When the upper frame member is displaced away from the cable guiding path, it has been moved in a lateral direction relative to the longitudinal direction of the cable guiding path, such that the upper frame member is not positioned above the cable guiding path.

In other words, in the second position the upper frame member may not extend above the cable guiding path, i.e. in the second position the upper frame member may not prevent a cable from being lowered onto the cable guiding path from a level above the plough.

The plough may be defined as extending in a longitudinal direction from the front end to the rear end.

In an embodiment of the plough, the upper frame member may be locked in the first position by a locking assembly. The locking assembly may comprise a pin or hole/socket arranged on the upper frame member, and a corresponding hole/socket or pin arranged on the base frame.

In an embodiment, the plough according to the invention comprises a cable depressor that may be positioned above the cable trough to hold a cable in place during use, the cable depressor may be movably connected relative to the cable trough, such that the cable depressor may move between a first position, wherein the cable depressor is arranged above the cable trough and the cable guiding path, and a second position, wherein the cable depressor is displaced away from the cable guiding path.

In other words, in the first position the cable depressor may be positioned to hold a cable in place within the cable trough.

The cable depressor may be movably connected to the base frame or the upper frame member, such that the cable depressor may move between the first and second position.

In an embodiment of the plough, the cable depressor may be pivotably connected relative to the cable trough.

In an embodiment of the plough, the cable depressor may be pivotably connected relative to the cable trough by a double-axis pivot connection, the double-axis pivot connection may be arranged to move the cable depressor away from the cable trough in an upwards direction and in a lateral direction relative to the cable trough In an embodiment, the plough according to the invention may comprise a bellmouth arranged at the front end, the bellmouth may comprise an upper section and a lower section, the upper section may be movably connected relative to the lower section, such that the upper section may move between a first position, wherein the bellmouth surrounds the cable guiding path, and a second position wherein the upper section is displaced away from the cable guiding path.

The upper section may be moved/pivoted in a lateral direction relative to the longitudinal direction of the cable guiding path when moved from the first position to the second position.

The lower section may be fixed to, or constitute an integral part of, the base frame In an embodiment of the plough, the upper frame member may comprise the upper section of the bellmouth. In other words, the upper section may be an integral part of the upper frame member, such that the upper section may move between the first and second position together with the upper frame member.

The cable guiding path may extend from the bellmouth to the rear end of the cable trough.

A cable may enter, or be lowered onto, the cable guiding path from above when the upper section, the upper frame and the cable depressor are in the respective second positions.

In an embodiment of the plough, the upper frame member may comprise a lifting and docking system, including stab-in guides. The upper frame member may also comprise any of a latching mechanism for a lifting wire and at least parts of an arrangement for tow wire attachment.

In an embodiment, the plough according to the invention may comprise a height-adjustable skid assembly connected to the base frame, the skid assembly arranged to lower and raise the base frame relative to a seabed during use.

In an embodiment of the plough, the skid assembly may comprise a pair of skids arranged on opposite sides of the base frame. The skids may be arranged on opposite sides of the bellmouth.

In an embodiment of the plough, the skid assembly may comprise a pair of stabilizer legs arranged on opposite sides of the ploughshare support.

In an embodiment of the plough, the upper frame member may be movably connected to the base frame by any suitable connection allowing the upper frame member to move between the first position and the second position. Such connections may for instance include pivot connections, allowing the upper frame member to pivot relative to the base frame, and/or slide connectors allowing the upper frame member to move linearly relative to the base frame. Both the pivot movement and the linear movement may be in a lateral direction relative to the longitudinal direction of the cable guiding path. Various combinations of slide and pivot connections may also be used to move the upper frame member between the first and second positions.

In an embodiment of the plough, the upper section may be movably connected relative to the base frame and/or the lower section by any suitable connection allowing the upper section to move between the first position and the second position. Such connections may for instance include pivot connections, allowing the upper section to pivot relative to the base frame and/or the lower section, and/or slide connectors allowing the upper section to move linearly relative to the base frame and/or the lower section. Both the pivot movement and the linear movement may be in a lateral direction relative to the longitudinal direction of the cable guiding path. Various combinations of slide and pivot connections may also be used to move the upper section between the first and second positions.

In an embodiment of the plough, the upper frame member may be pivotably connected relative to the base frame by at least one pivot coupling.

The upper frame member may be pivotably connected relative to the cable guiding path by the at least one pivot coupling, or pivotably connected to the base frame by the at least one pivot coupling.

In an embodiment of the plough, the upper section may be pivotably connected relative to the lower section by the at least one pivot coupling.

In an embodiment of the plough, the at least one pivot coupling interconnects the upper frame member and the base frame.

In an embodiment of the plough, the movement of any of the upper section, the upper frame member and the cable depressor, between their respective first and second positions is remote controlled.

In an embodiment of the plough, the movement of any of the upper section, the upper frame member and the cable depressor, between their respective first and second positions is actuated by a suitable actuator, such as hydraulic cylinders, hydraulic rotary actuators and electric motors or any combination thereof.

In an embodiment of the plough, the locking assembly is remote controlled.

When in the respective second positions, any of the upper section, the cable depressor and the upper frame member is positioned at a lateral side of the cable guiding path, i.e. such that access to the cable guiding path from above is unhindered, i.e. such that top access to the cable guiding path is unobstructed.

In a second aspect, the present invention provides a method of loading a cable into a cable plough, the cable plough comprising a base frame, an upper frame member and a ploughshare support; and a topside of the ploughshare support features a cable trough;

a cable guiding path extends from a front end to a rear end of the plough, the cable guiding path arranged between the base frame and the upper frame member and along the cable trough;

the upper frame member is movably connected relative to the base frame;

wherein the method comprises the steps of:
initially arranging the plough on a seabed;
moving the upper frame member from a first position, wherein the upper frame member is arranged above the cable guiding path, to a second position wherein the upper frame member is displaced away from the cable guiding path;
lowering a cable onto the cable guiding path when the upper frame member is in the second position.

When in the second position, the upper frame member is positioned at a lateral side of the cable guiding path, i.e. such that access to the cable guiding path from above is unhindered.

In an embodiment of the method, the plough may comprise a bellmouth arranged at the front end, the bellmouth comprises an upper section and a lower section, the upper section being movably connected relative to the lower section, and the step of lowering the cable onto the cable guiding path is preceded by a step of:
moving the upper section from a first position, wherein the bellmouth surrounds the cable guiding path, to a second position wherein the upper section is displaced away from the cable guiding path.

When the upper section is moved from the first position to the second position, it is moved in a lateral direction relative to the longitudinal direction of the cable guiding path, such that the upper section is not positioned above the cable guiding path.

In an embodiment of the method, the plough comprises a cable depressor that may be positioned above the cable trough to hold the cable in place during use, the cable depressor is movably connected relative to the cable trough, and the step of lowering the cable onto the cable guiding path is preceded by a step of:

moving the cable depressor from a first position, wherein the cable depressor is arranged above the cable trough and the cable guiding path, to a second position, wherein the cable depressor is displaced away from the cable guiding path.

In an embodiment of the method, the step of lowering the cable onto the cable guiding path is followed by the step of:

moving the upper frame member, and optionally any of the upper section and the cable depressor, into their respective first positions, such that the cable is held in place along the cable guiding path.

The cable plough used in the method according to the second aspect may comprise any of the features of the plough according to the first aspect.

In the present disclosure, the term "bellmouth" is intended to comprise any structure having a tapered inner periphery suitable for steering a cable entering the cable guiding path of the plough.

BRIEF DESCRIPTION OF THE DRAWINGS

Embodiments of the invention is described in detail by reference to the following drawings.

DETAILED DESCRIPTION OF THE INVENTION

In the following, an exemplary plough according to the invention will be discussed in more detail with reference to the appended drawings.

Figure 1:
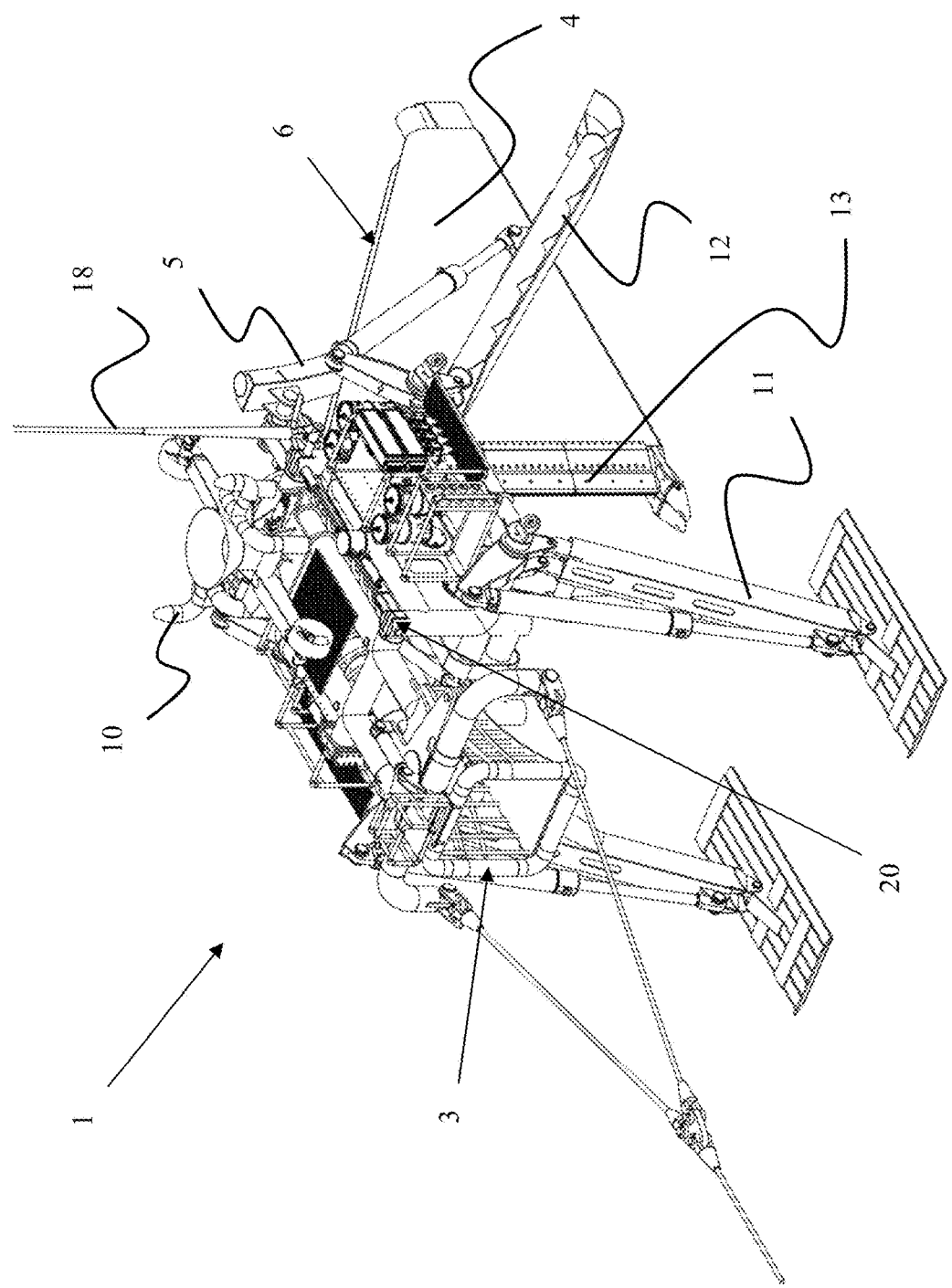
FIG. 1 is a perspective view of an exemplary plough according to the invention.
Figure 2:
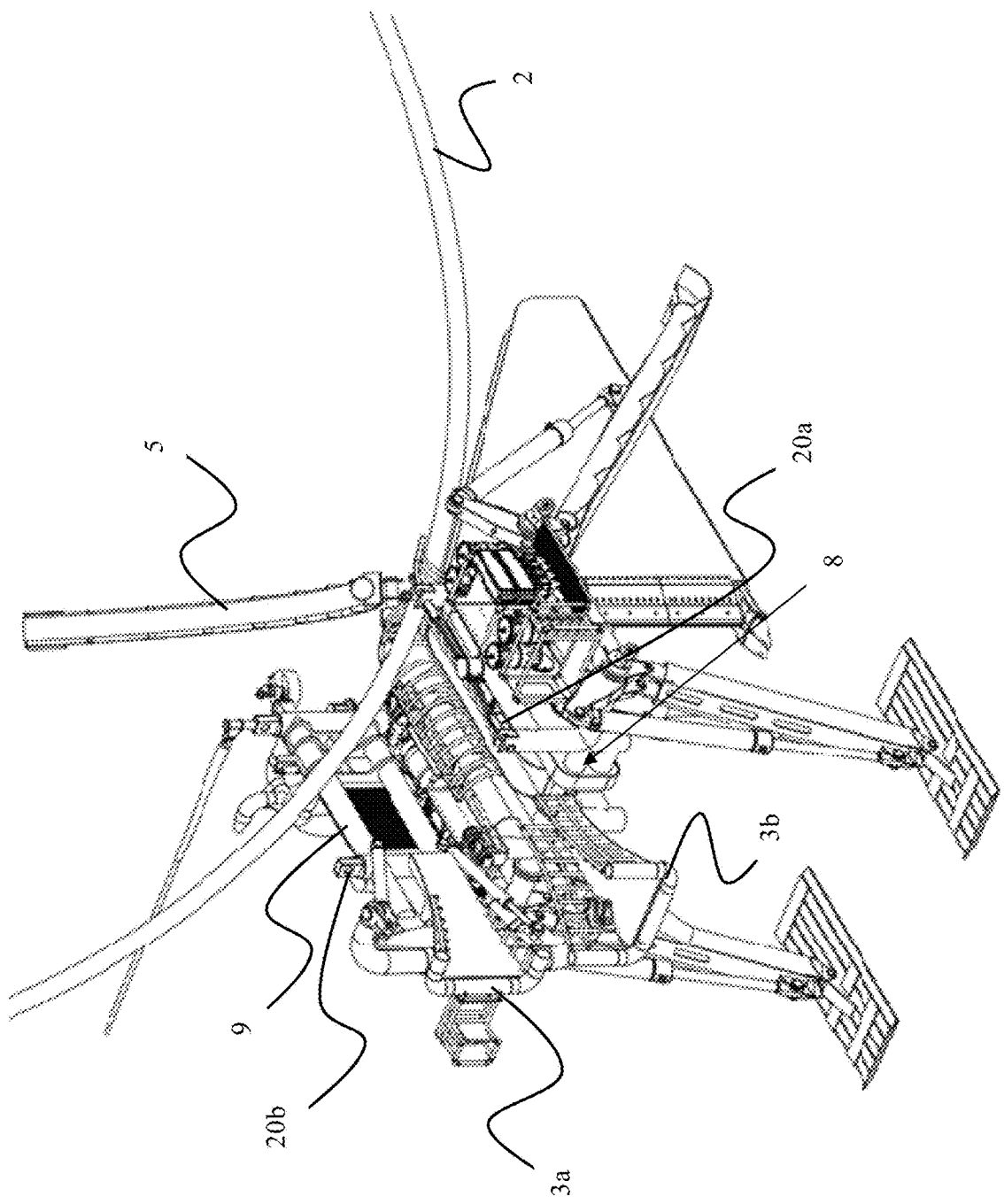
FIG. 2 is a perspective view of the plough in FIG. 1 during initial lowering of a cable onto a cable guiding path of the plough.

In an initial step of a cable burying operation using the plough according to the invention, the plough is arranged on a seabed, see FIG. 1. After being landed on the seabed, the plough 1 is prepared for loading of a cable 2 by pivoting an upper frame member 9 away from a base frame 8, see FIG. 2. By opening an upper section of the plough, the cable 2 may be loaded onto the plough from above.

Figure 5:
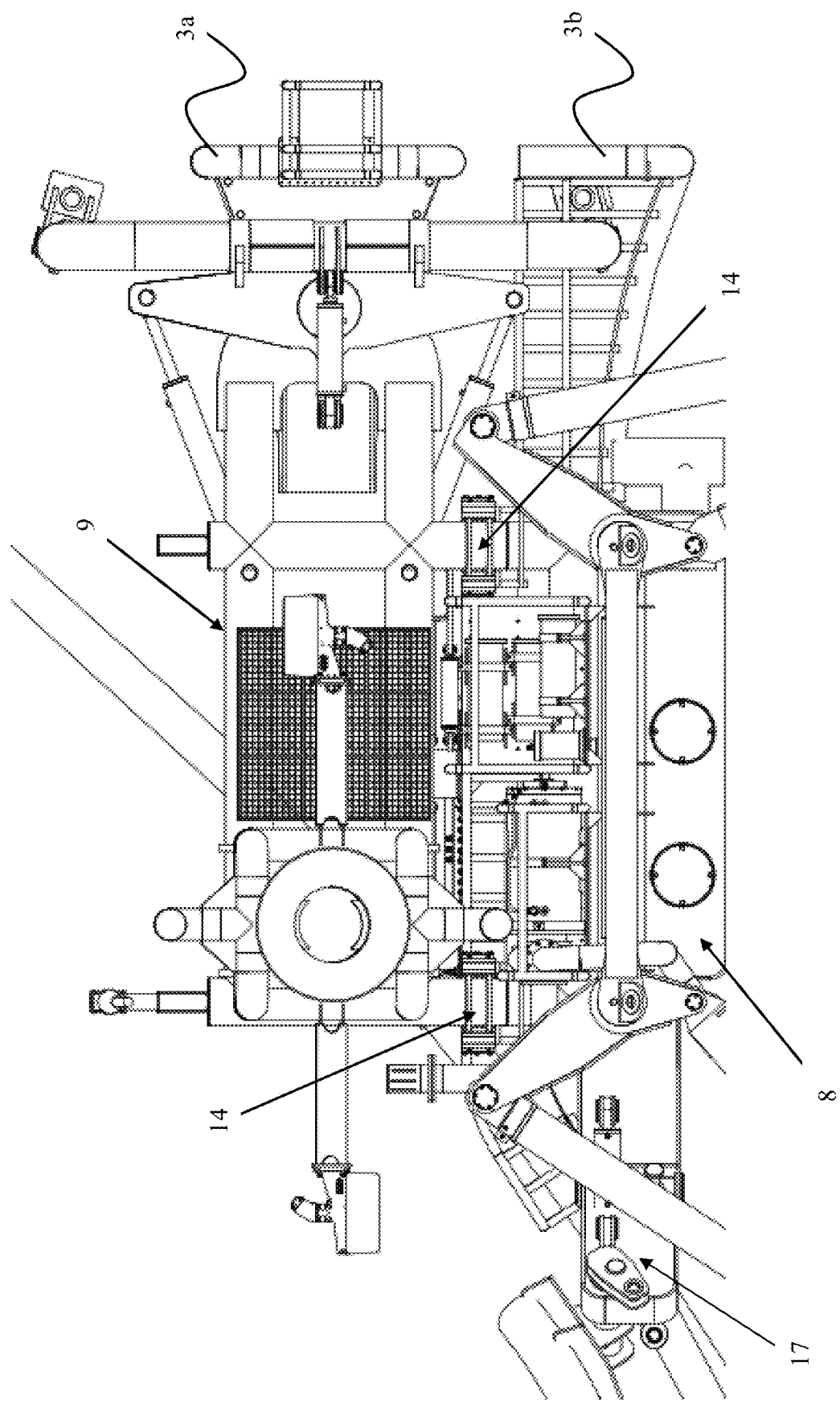
FIG. 5 is a detailed view of the plough in FIG. 2.

The upper frame member 9 is pivotably connected to the base frame 8 by two pivot couplings 14, see FIG. 5. In the present embodiment, the upper frame member comprises a lifting and docking interface, including stab-in guides 10. The A bellmouth 3 is arranged at a front end 15 of the plough 1, and a ploughshare support 4 is arranged at a rear end 16.

A topside of the ploughshare support 4 features a cable trough 6. A cable depressor 5 may be positioned above the cable trough 6 to hold a cable 2 in place during the cable laying operation. The ploughshare support 4 features a ploughshare 13 arranged at an edge of the ploughshare support 4 facing the front end 15.

Figure 3:
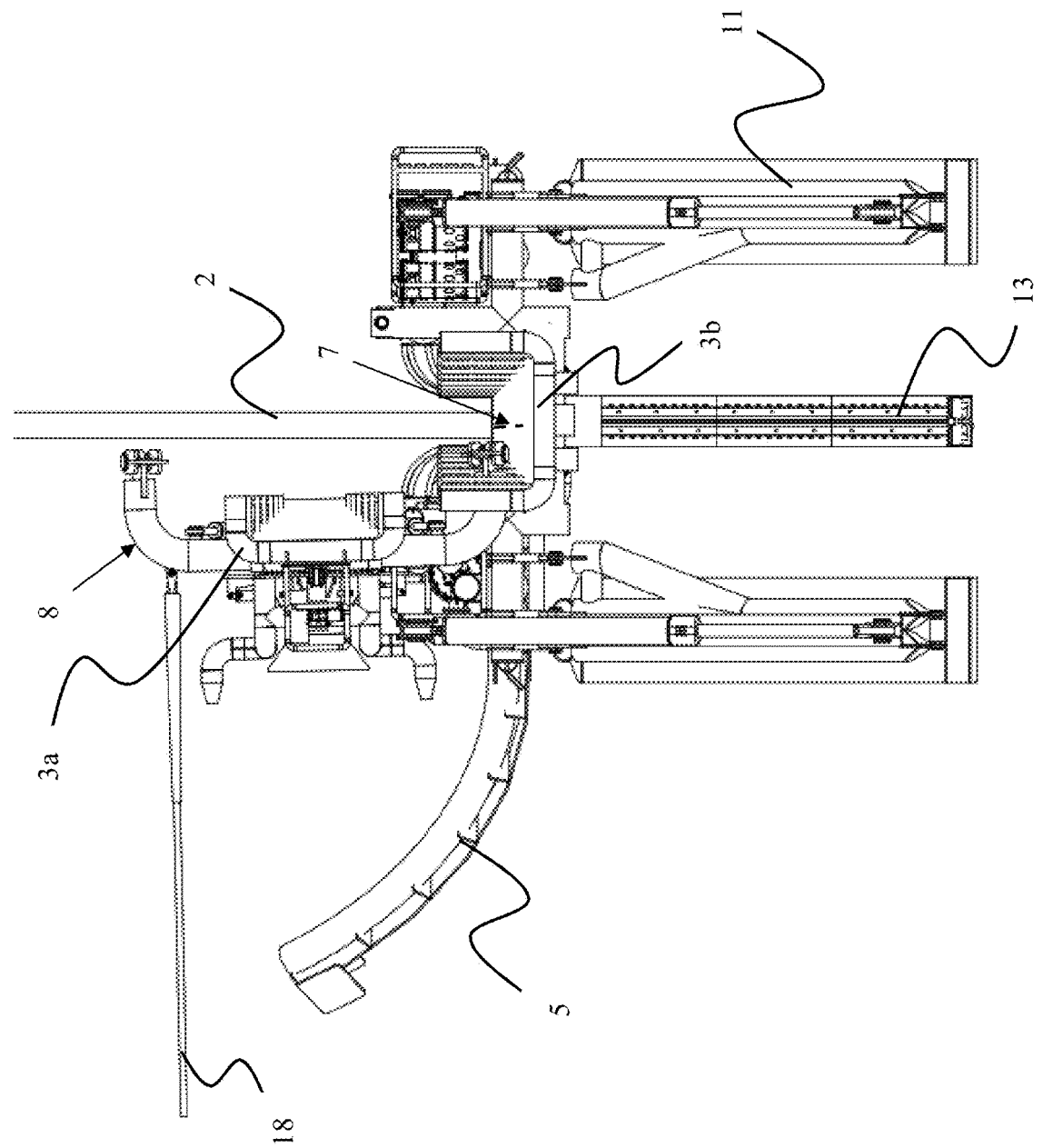
FIG. 3 is a front side view of the plough in FIG. 2.
Figure 4:
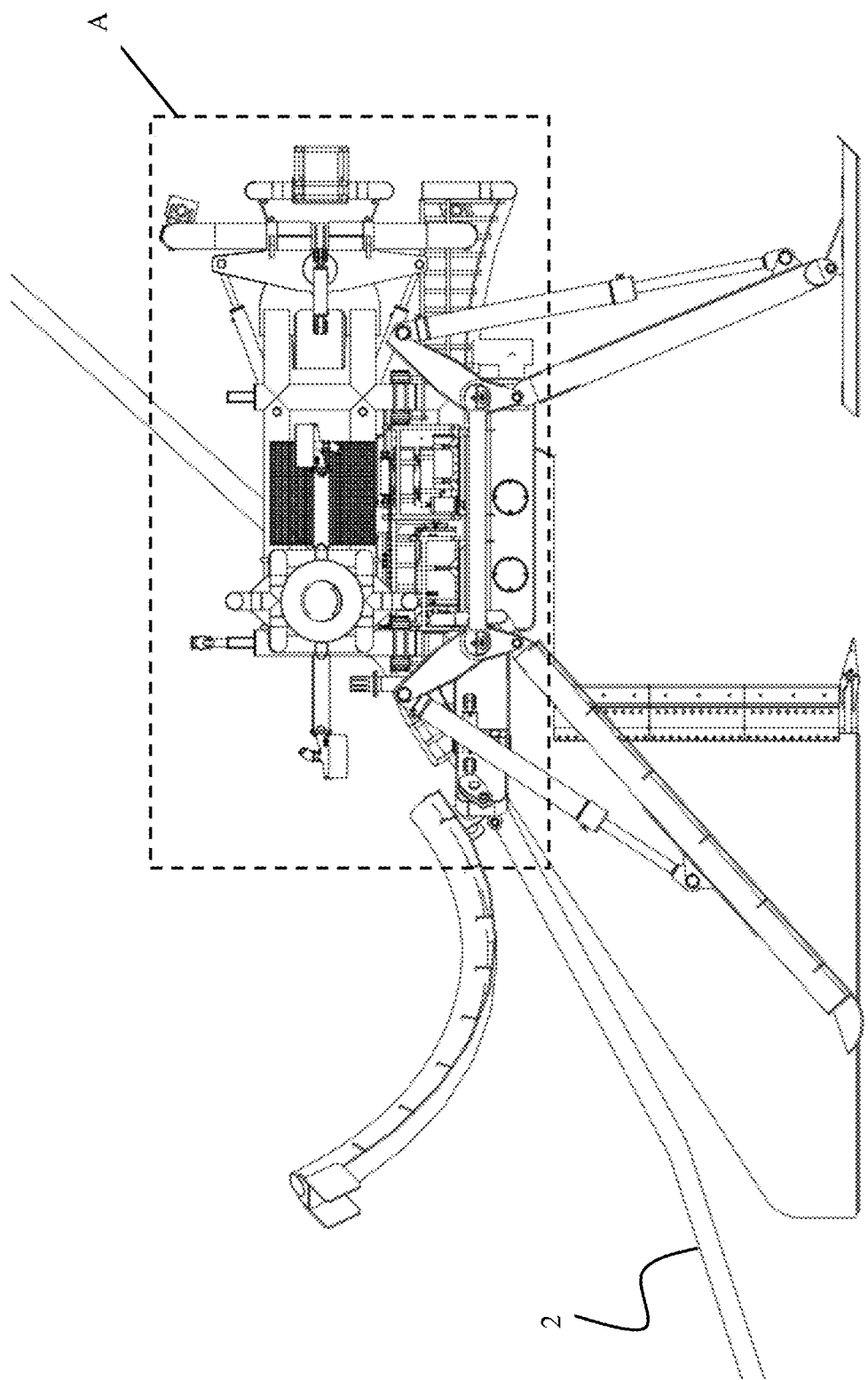
FIG. 4 is a side view of the plough in FIG. 2.
Figure 6:
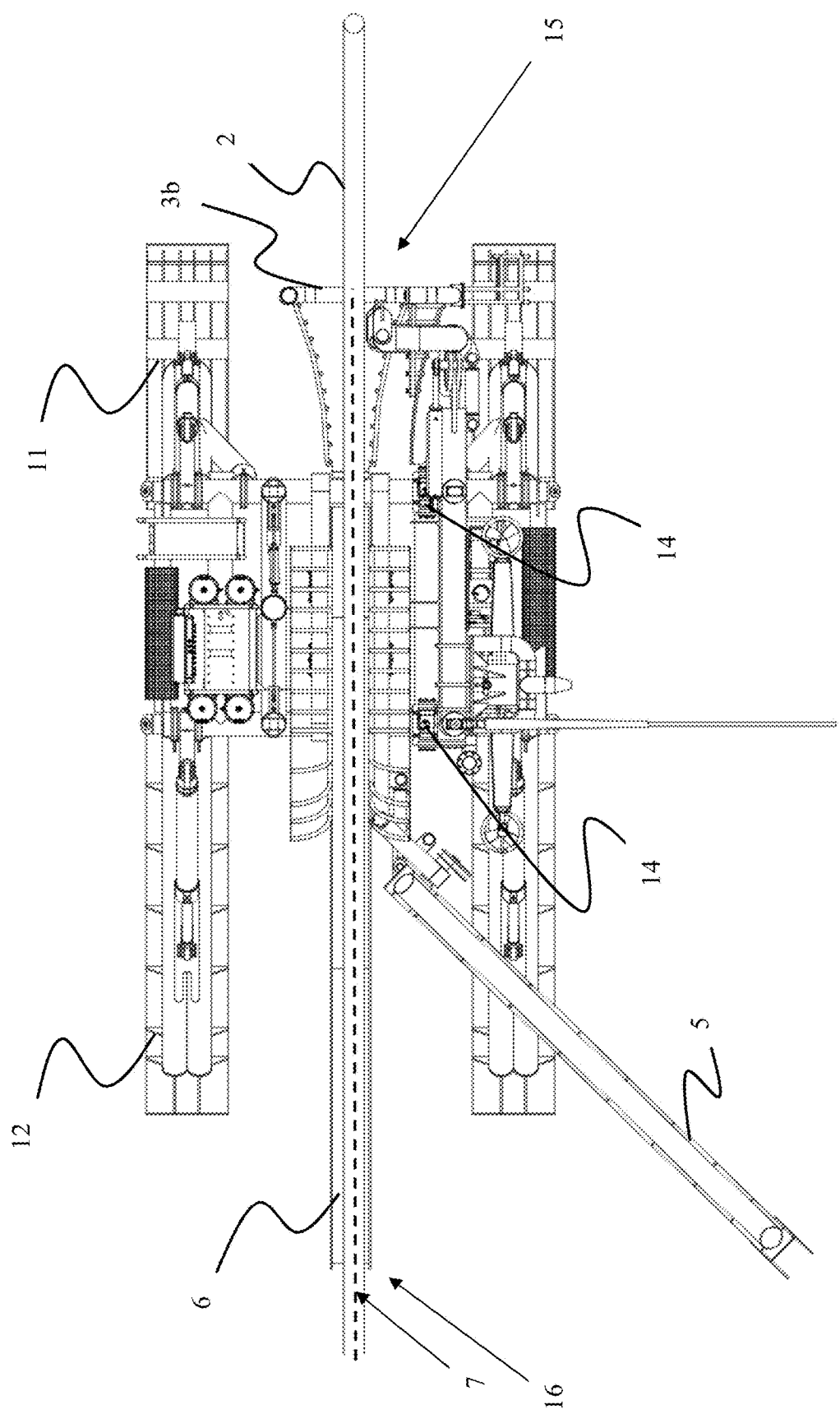
FIG. 6 is a topside view of the plough in FIG. 2.

A cable guiding path 7, see FIGS. 3 and 6, extends from the front end 15 to the rear end 16. The cable guiding path 7 passes through the bellmouth 3, bellow the upper frame member 9 and within the cable trough 6.

The upper frame member 9 may move between a first position, wherein the upper frame member 9 is arranged above the cable guiding path 7, and a second position wherein the upper frame member 9 is displaced away from the cable guiding path 7. The upper frame member 9 may be locked in the first position by a locking assembly 20. In the present embodiment, the locking assembly features a cooperating pin 20a and hole 20b mechanism.

The cable depressor 5 is pivotably connected relative to the cable trough 6 via a double-axis pivot connection 17, see FIG. 5. The pivot connection 17 allows the cable depressor 5 to pivot between a first position, wherein the cable depressor 5 is arranged above the cable trough 6, see FIG. 1, and a second position, wherein the cable depressor 5 is displaced upwards and away from the cable trough 6 in a lateral direction, see FIG. 2.

The bellmouth 3 features an upper section 3a and a lower section 3b. The upper section 3a is pivotably connected relative to the lower section 3b, such that the upper section 3a may pivot between a first position, wherein the bellmouth 3 surrounds the cable guiding path 7, and a second position wherein the upper section 3a is pivoted away from the cable guiding path 7. The lower section 3b may be fixed to, or constitute an integral part of, the base frame 8. In the second position, the upper section 3a is displaced in a lateral direction relative to the longitudinal direction of the cable guiding path 7.

The bellmouth 3 has a tapered inner periphery suitable for avoiding small bend radii being forced upon a cable 2 entering the plough 1 at the front end 15.

The plough features a height-adjustable skid assembly connected to the base frame 8. The skid assembly is arranged to lower and raise the base frame 8 relative to the seabed and comprises a pair of skids 11 and a pair of stabilizer legs 12 arranged on opposite sides of the base frame 8. During a cable laying operation, the skids 11 and stabilizer legs 12 are retracted towards the base frame 8 to lower the ploughshare 13 into the seabed.

The plough is in communication with the topside while being arranged on the seabed, for instance via an umbilical 18. Thus, the movement of any of the upper section 3a, the upper frame member 9 and the cable depressor 5 between their respective first and second positions is remote controlled. In this manner, the plough may initially be lowered to the seabed having the upper section 3a, the upper frame member 9 and the cable depressor 5 in their respective first positions, i.e. covering at least parts of the cable guiding path 7, as shown in FIG. 1.

Figure 7:
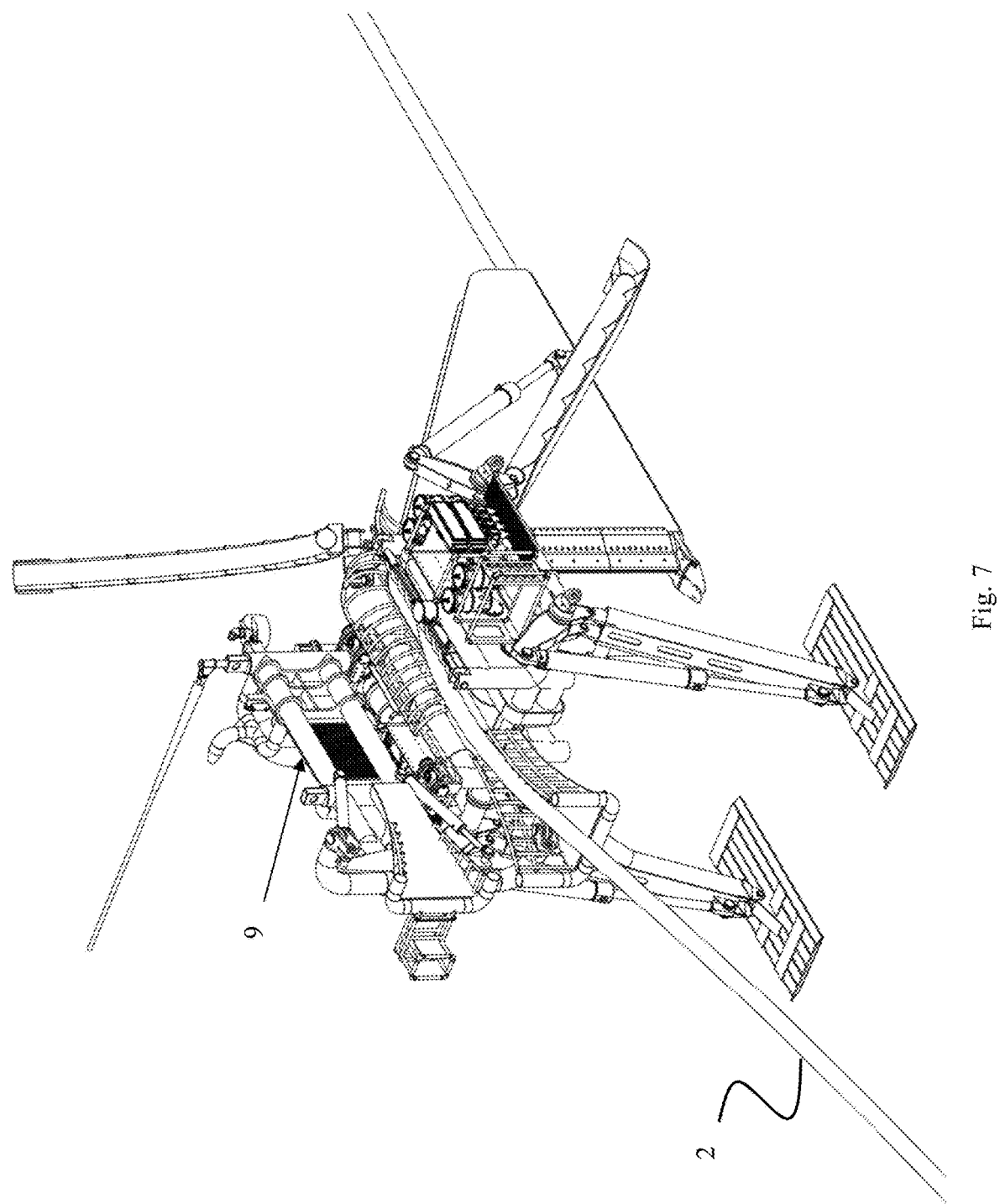
FIG. 7 is a perspective view of the plough in FIG. 1 featuring a cable arranged along the cable guiding path of the plough.
Figure 8:
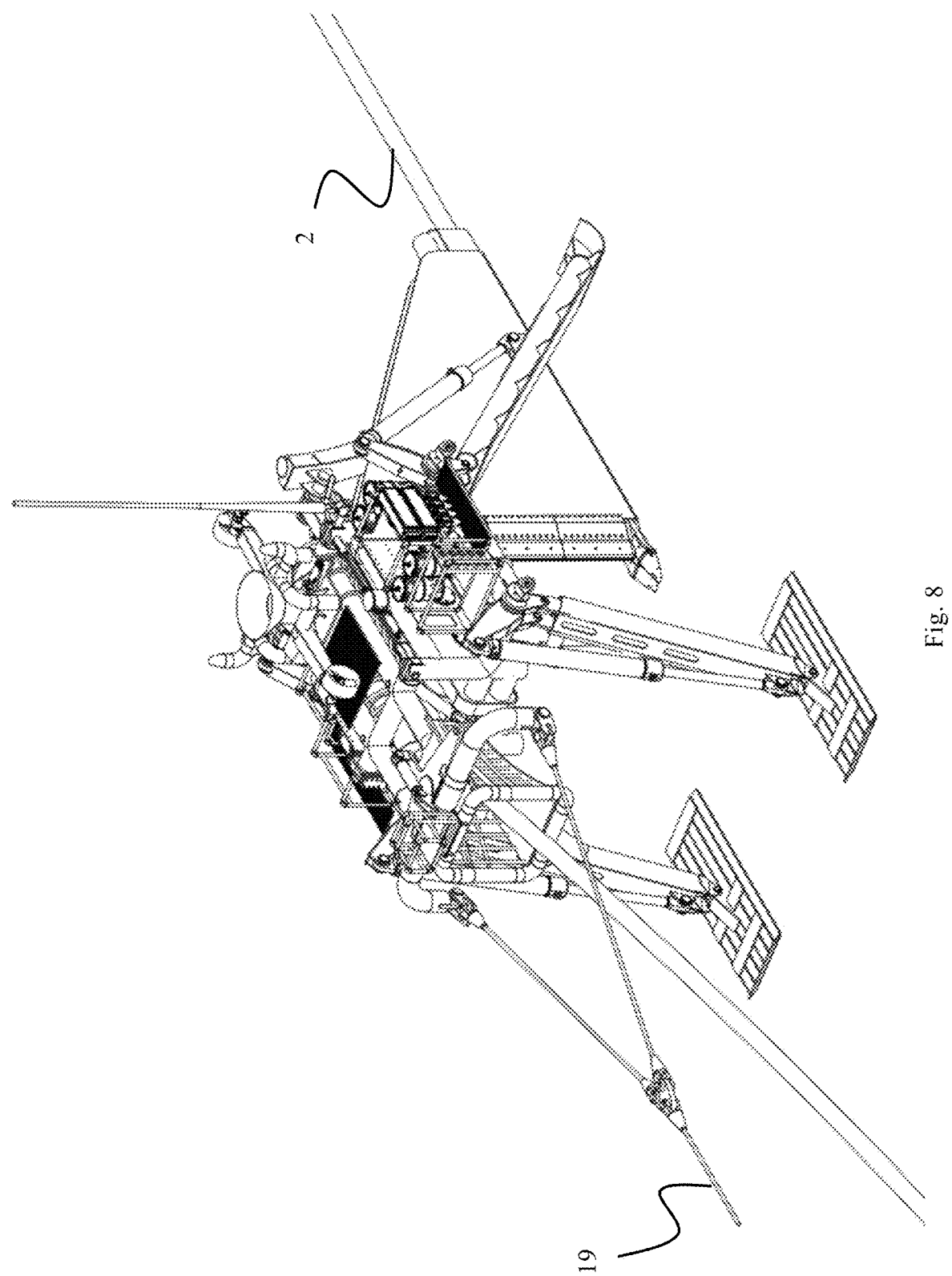
FIG. 8 is a perspective view of the plough in FIG. 1 featuring a cable arranged along and accommodated in the cable guiding path of the plough.

After being arranged on the seabed, the upper section 3a, the upper frame member 9 and the cable depressor 5 are moved to their respective second positions providing free access to the whole extent of the cable guiding path 7 from above. The cable may subsequently be lowered towards the cable guiding path of the plough, see FIGS. 2-5, and arranged along said path, see FIGS. 6 and 7. Finally, the upper section 3a, the upper frame member 9 and the cable depressor 5 are moved to their respective first positions to secure the cable along the cable guiding path 7, see FIG. 8.

When the cable 2 is secured, the ploughshare 13 is lowered towards towards/into the seabed (not shown) and the ploughing/cable laying operation may start. During the ploughing operation, the plough is towed via the wire 19 by a suitable towing vessel.

The method made possible by use of the plough according to the invention minimizes the bend radii forced onto the cable during loading and installation at the seabed. The avoidance of small bend radii allows for the use of the plough with cables of different types and designs than what is commonly possible with the prior art ploughs.

In the specific embodiment of the invention illustrated in FIGS. 1-8, the upper frame member 9 is pivotably connected to the base frame 8. However, in further embodiments it is envisioned that the upper frame member 9 may be movably connected to the base frame 8 by any suitable connection allowing the upper frame member to move between the first position and the second position. Such connections may for instance include slide connectors allowing the upper frame member 9 to move linearly relative to the base frame 8. The linear movement may be in a lateral direction relative to the longitudinal direction of the cable guiding path 7. Various combinations of slide and pivot connections may also be used to move the upper frame member 9 between the first and second positions.

In the specific embodiment of the invention illustrated in FIGS. 1-8, the upper section of the bellmouth 3 is pivotably connected to the base frame 8. However, in further embodiments it is envisioned that the upper section 3a may be movably connected relative to the base frame 8 by any suitable connection allowing the upper section 3a to move between the first position and the second position. Such connections may for instance include slide connectors allowing the upper section 3a to move linearly relative to the base frame 8. The linear movement may be in a lateral direction relative to the longitudinal direction of the cable guiding path 7. Various combinations of slide and pivot connections may also be used to move the upper section 3a between the first and second positions.

In the specific embodiment of the invention illustrated in FIGS. 1-8, the cable depressor 5 is pivotably connected relative to the cable trough 6 via a double-axis pivot connection 17. However, in further embodiments it is envisioned that the cable depressor 5 may be movably connected relative to cable trough 6 by any suitable connection allowing the cable depressor 5 to move between the first position and the second position. The cable depressor 5 may for instance be connected relative to the cable trough 6 via a pivot coupling for moving the cable depressor 5 in a vertical direction and a slide connector for moving the cable depressor in a lateral direction relative to the longitudinal direction of the cable guiding path 7 or cable trough 6

In the specific embodiment of the invention illustrated in FIGS. 1-8, the upper section of the bellmouth 3 is an integral part of the upper frame member 9, while the cable depressor 5 may be moved as a separate element independent of the upper frame member. However, in other embodiments of the invention, the movements required to provide access to the cable guiding path 7 from above may be obtained by other structural combinations of the upper section 3a, the upper frame member and the cable depressor. Such structural combinations may comprise having the upper section of the bellmouth pivotably connected to the base frame independent of the upper frame member. Other combinations may comprise having the cable depressor pivotably connected to the upper frame member.

It is also envisioned that any of the upper section 3a and the upper frame member 9 may be comprised by a plurality of elements, wherein each element may be moved between a first and second position relative to the cable guiding path. The upper frame member may for instance comprise two halves, wherein each half may be moved to a second position on opposite sides of the cable guiding path.

The invention claimed is:

1. A top loading plough for burying a cable, the plough comprises:
   a two part frame including a base frame, and an upper frame member movably connected thereto;
   a ploughshare support;
   a topside of the ploughshare support features a cable trough; and
   a cable guiding path extends from a front end to a rear end of the plough, the cable guiding path is arranged between the base frame and the upper frame member and along the cable trough;
   wherein the upper frame member is articulated relative to the base frame parallel to said cable guiding path, such that the upper frame member may move between a first position, wherein the upper frame member is arranged covering the cable guiding path, and a second position wherein the upper frame member is displaced away from the cable guiding path;
   wherein the whole extent of the cable guiding path is accessible from above when the upper frame member is in the second position, such that a cable may be lowered onto the cable guiding path,
   said top loading plough further comprising a cable depressor that may be positioned above the cable trough to hold a cable in place during use, the cable depressor is movably connected relative to the cable trough, such that the cable depressor may move between a first position, wherein the cable depressor is arranged above the cable trough and the cable guiding path, and a second position, wherein the cable depressor is displaced away from the cable guiding path,
   wherein the cable depressor is pivotably connected relative to the cable trough by a double-axis pivot connection, the double-axis pivot connection arranged to move the cable depressor away from the cable trough in an upwards direction and in a lateral direction relative to the cable trough,
   wherein a bellmouth is arranged at the front end, the bellmouth comprises an upper section and a lower section, the upper section is movably connected relative to the lower section, such that the upper section may move between a first position, wherein the bellmouth surrounds the cable guiding path, and a second position wherein the upper section is displaced away from the cable guiding path, wherein the upper section of the bellmouth is a separate element included on said upper frame member.

2. The plough according to claim 1, wherein the upper frame member comprises a lifting and docking system, including stab-in guides.

3. The plough according to claim 1, wherein the upper frame member is pivotably connected relative to the base frame by at least one pivot coupling.

4. The plough according to claim 3, wherein the upper section is pivotably connected relative to the lower section by the at least one pivot coupling.

5. The plough according to claim 3, wherein the at least one pivot coupling interconnects the upper frame member and the base frame.

6. The plough according to claim 1, wherein the movement of any of the upper section, the upper frame member and the cable depressor between their respective first and second positions is remote controlled.

7. A method of loading a cable into a cable plough, the cable plough comprising a two part frame including a base frame and an upper frame member movably connected thereto, and a ploughshare support
- a topside of the ploughshare support features a cable trough,
- a cable guiding path extends from a front end to a rear end of the plough, the cable guiding path arranged between the base frame and the upper frame member and along the cable trough;
- the upper frame member is articulated relative to the base frame parallel to said cable guiding path;
- said top loading plough further comprising a cable depressor that may be positioned above the cable trough to hold a cable in place during use, the cable depressor is movably connected relative to the cable trough, such that the cable depressor may move between a first position, wherein the cable depressor is arranged above the cable trough and the cable guiding path, and a second position, wherein the cable depressor is displaced away from the cable guiding path,
- wherein the cable depressor is pivotably connected relative to the cable trough by a double-axis pivot connection, the double-axis pivot connection arranged to move the cable depressor away from the cable trough in an upwards direction and in a lateral direction relative to the cable trough,
- wherein a bellmouth is arranged at the front end, the bellmouth comprises an upper section and a lower section, the upper section is movably connected relative to the lower section, such that the upper section may move between a first position, wherein the bellmouth surrounds the cable guiding path, and a second position wherein the upper section is displaced away from the cable guiding path, wherein the upper section of the bellmouth is a separate element included on said upper frame member,
- wherein the method comprises the steps of:
  - arranging the plough on a seabed;
  - moving the upper frame member from a first position, wherein the upper frame member is arranged covering the cable guiding path, to a second position wherein the upper frame member is displaced away from the cable guiding path;
  - lowering a cable onto the cable guiding path when the upper frame member is in the second position.

8. The method according to claim 7, wherein the plough comprises a bellmouth arranged at the front end, the bellmouth comprises an upper section and a lower section, the upper section being movably connected relative to the lower section, and the step of lowering the cable onto the cable guiding path is preceded by a step of:
- moving the upper section from a first position, wherein the bellmouth surrounds the cable guiding path, to a second position wherein the upper section is displaced away from the cable guiding path.

9. The method according to claim 7, wherein the step of lowering the cable onto the cable guiding path is preceded by a step of:
- moving the cable depressor from a first position, wherein the cable depressor is arranged above the cable trough and the cable guiding path, to a second position, wherein the cable depressor is moved away from the cable guiding path.

10. The method according to claim 7, wherein the step of lowering the cable onto the cable guiding path is followed by the steps of:
- moving the upper frame member into their respective first positions, such that the cable is held in place along the cable guiding path.

11. A top loading plough for burying a cable, the plough comprises:
- a two part frame including a base frame and an upper frame member movably connected thereto, and a ploughshare support;
- a topside of the ploughshare support features a cable trough; and
- a cable guiding path extends from a front end to a rear end of the plough, the cable guiding path is arranged between the base frame and the upper frame member and along the cable trough;
- wherein the upper frame member is articulated relative to the base frame parallel to said cable guiding path, such that the upper frame member may move between a first position, wherein the upper frame member is arranged covering the cable guiding path, and a second position wherein the upper frame member is displaced away from the cable guiding path;
- wherein the whole extent of the cable guiding path is accessible from above when the upper frame member is in the second position, such that a cable may be lowered onto the cable guiding path,
- said top loading plough further comprising a cable depressor that may be positioned above the cable trough to hold a cable in place during use, the cable depressor is movably connected relative to the cable trough, such that the cable depressor may move between a first position, wherein the cable depressor is arranged above the cable trough and the cable guiding path, and a second position, wherein the cable depressor is displaced away from the cable guiding path,
- wherein the cable depressor is pivotably connected relative to the cable trough by a double-axis pivot connection, the double-axis pivot connection arranged to move the cable depressor away from the cable trough in an upwards direction and in a lateral direction relative to the cable trough,
- wherein the plough further comprises a bellmouth arranged at the front end, the bellmouth comprises an upper section and a lower section, the upper section is movably connected relative to the lower section, such that the upper section may move between a first position, wherein the bellmouth surrounds the cable guiding path, and a second position wherein the upper section is displaced away from the cable guiding path, wherein the upper section of the bellmouth is a separate element included on said upper frame member.

* * * * *